May 6, 1958 R. WEISS 2,833,191
HOLDING MEANS FOR PHOTOGRAPHIC MASKS AND ACCESSORIES
Filed June 19, 1952 3 Sheets-Sheet 1

Richard Weiss
INVENTOR,
BY Charles Shepard
ATTORNEY

May 6, 1958 R. WEISS 2,833,191
HOLDING MEANS FOR PHOTOGRAPHIC MASKS AND ACCESSORIES
Filed June 19, 1952 3 Sheets-Sheet 2

Richard Weiss
INVENTOR,
BY Charles Shepard
ATTORNEY

May 6, 1958 R. WEISS 2,833,191
HOLDING MEANS FOR PHOTOGRAPHIC MASKS AND ACCESSORIES
Filed June 19, 1952 3 Sheets-Sheet 3

Richard Weiss
INVENTOR,

BY Charles Shepard
ATTORNEY

UNITED STATES PATENT OFFICE 2,833,191
Patented May 6, 1958

2,833,191

HOLDING MEANS FOR PHOTOGRAPHIC MASKS AND ACCESSORIES

Richard Weiss, Braunschweig, Germany, assignor to Franke & Heidecke, Fabrik Photographischer Präzisions-Apparate, Braunschweig, Germany, a German firm Application June 19, 1952, Serial No. 294,466

Claims priority, application Germany June 20, 1951

2 Claims. (Cl. 95—49)

The present invention relates to photography, and more particularly to the ground glass or similar focusing screens for reflex cameras, and it has for its general object to provide a simple, efficient and convenient means for temporarily securing in position in superposed relationship to the screen a detachable mask commonly used to correspondingly reduce the area of the focusing image on the screen when the normal or maximum picture area of the sensitized material in the focal plane of the camera is reduced as by the use of an adapter and field reducing mask. For instance, it may be desired to use a 35 mm. film in a reflex camera having a focal plane exposure opening capacity of 6 x 6 cm. In such cases it has been the practice to insert a mask through the top opening of the focusing hood and simply lay it over the focusing screen to reduce the screen image. This serves the purpose when the camera is used in normal substantially horizontal position, but when swung about or used at extreme inclinations the mask is apt to fall out or become displaced. With the present device the mask is retained in a definite position close against the focusing screen whatever the position of the camera.

Another object of the invention is to provide such a construction with an exteriorly accessible manual operating means that is easily assembled with the camera or focusing hood body and releasably holds the mask retaining means.

A further object is, in the provision of the mask retaining means, to utilize the same spring means that ordinarily holds the focusing screen in place to also energize the mask retaining means.

These and other desirable objects may be attained in the manner disclosed as illustrative embodiments of the invention in the following description and in the accompanying drawings forming a part hereof, in which.

The same reference numerals throughout the several views indicate the same parts.

Figure 1:
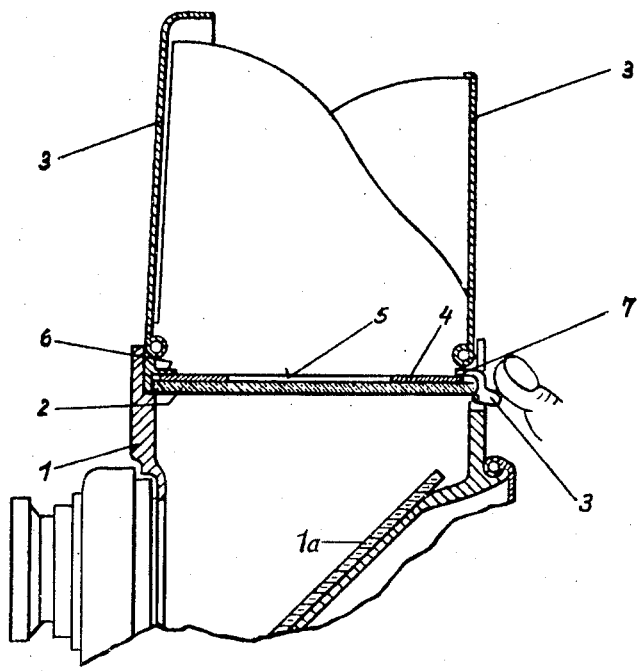
Fig. 1 is a fragmentary front to rear central vertical section of the focusing chamber and hood of a reflex camera showing the invention in one form and in general, certain of the smaller parts being, in the interest of clarity, omitted where they appear in larger scale in subsequent views.

Referring more particularly to the drawings and first to Figs. 1 to 4 thereof, 1 indicates the camera body in the region of the focusing chamber containing the mirror 1a that casts the image from the lens up to the ground glass or similar focusing screen 2 at the top of the chamber. The usual folding hood 3 rises above the screen. An inwardly flanged frame 10 on the body at the base of the hood forms a seat for the screen 2 that underlies it and is thrust upwardly tightly against it by a leaf spring 9 at the rear edge.

Assuming that the screen 2 in its frame 10 has a usual image capacity of 6 x 6 cm. and it is desired to take miniature exposures on 35 mm. perforated film, an image field mask 4 formed with an image aperture 5 having an area, for example, of 24 x 35 mm., is inserted in the light hood 3. The front edge thereof is fitted under fixed projecting lugs 6 on the body. At the rear, the mask is engaged and held down tight against the screen by a forwardly projecting arm or arms 7 on a clip or clips 8 let into the rear wall of the body. A lower forwardly extending arm 13 on the clip engages under an extension 11 on leaf spring 9 which has a rearwardly and downwardly inclined slotted lug 11a hugging the adjacent body wall or the vertical portion of frame 10 disposed against the same. Arm 13 is retained in the slotted lug 11a by a head 12 at its extremity engaging the inclined inner face of the lug in opposition to a fulcrum pin 14 fixed in the rear body wall and contacting the clip 8 adjacent to the base of arm 13. In alignment with this fulcrum pin an operating finger piece 8a projects rearwardly from clip 8 to be accessible from the exterior of the camera and hood body.

Figure 2:
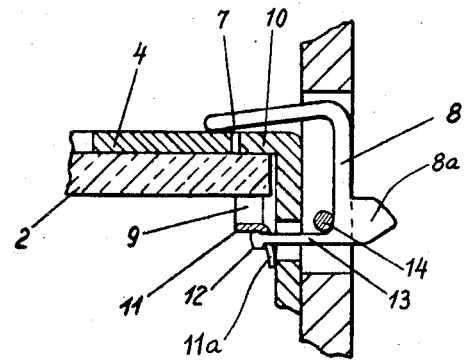
Fig. 2 is an enlarged fragmentary section in the same plane and confined to the clamping and releasing clip and adjacent parts in detail, the clip being there in clamping position.
Figure 3:
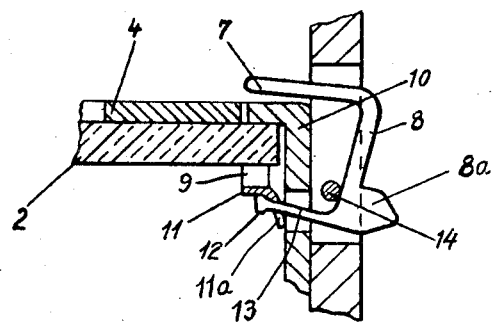
Fig. 3 is a view similar to Fig. 2 but with the clip shown in released position.
Figure 4:
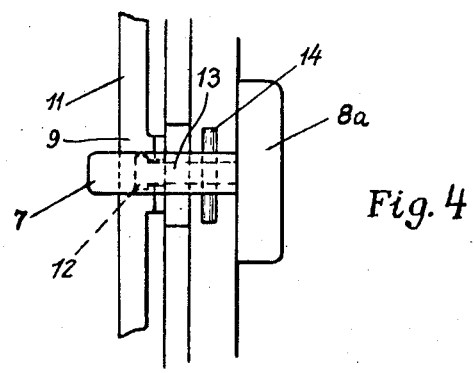
Fig. 4 is a fragmentary top plan view of the showing of Fig. 2.

Thus it will be seen that the screen supporting spring 9, normally under a partial degree of tension, reacts against lower arm 13 of clip 8 by which it is supported and rocks the latter forwardly on fulcrum pin 14 so that upper arm 7 is urged downwardly to press upon and retain an element such as mask 4 securely against the surface of screen 2 as in Fig. 2. A downward finger pressure on operating element 8a further compresses spring 9 by the upward movement of lower arm 13 and at the same time raises upper arm 7 as in Fig. 3 and releases element 4 for removal of the hood, thereby restoring the screen to full image capacity. Inasmuch as it floats on fulcrum 14 it will be seen that, as an assembly proposition, the clip is easily inserted through the opening in the body wall and the headed arm 13 is easily interlocked with the slotted lug 11a on the spring to hold all associated parts together. The one spring both supports the screen and energizes the retaining clip.

Figure 5:
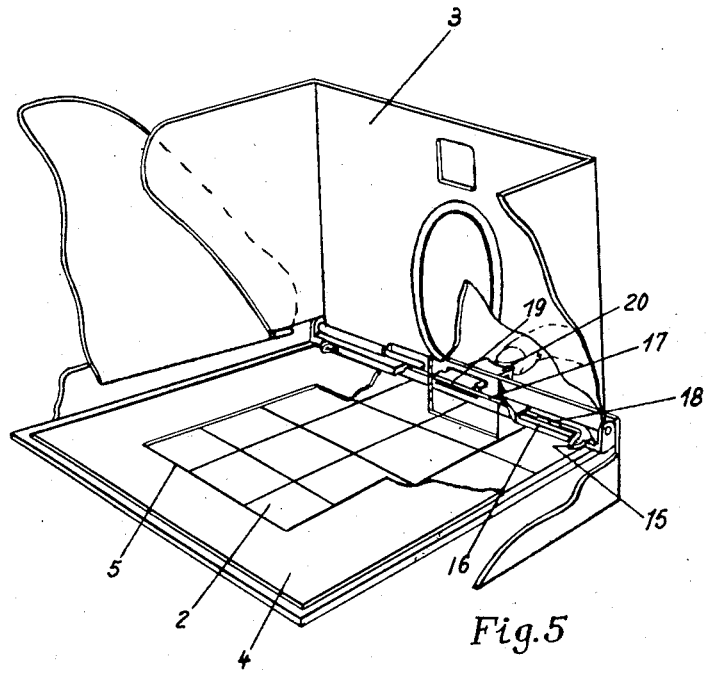
Fig. 5 is an inside perspective view, partly broken away, of the hood, focusing screen, mask, and mask retaining parts of another form of the invention, and Fig. 6 an enlarged, detail horizontal section through the rear wall of the hood showing the mask retaining means of Fig. 5.
Figure 6:
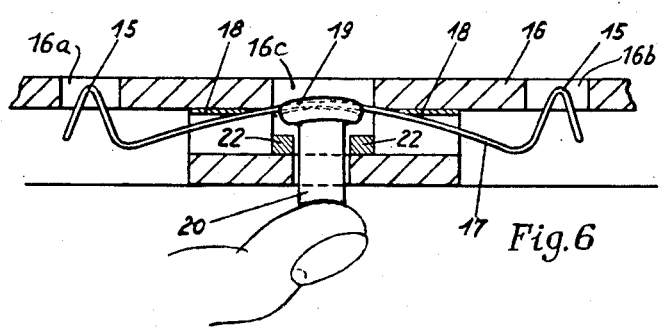

In the second embodiment of the invention, is disclosed in Figs. 5 and 6, a retaining clip is shown which does not depend upon a screen supporting spring to energize it. Here, the rear wall 16 of the camera or hood body is provided with two openings 16a and 16b and with an intermediate opening 16c just above the plane of the focusing screen. Opposite the latter a housing bracket 18 on the exterior of the body provides a guide for a push button 20. The base of the push button is provided with a transverse guide groove 19 (dotted lines Fig. 6) in which the center portion of a spring 17 is held. Inwardly bent portions 15 at the two ends of the spring normally project through the openings 16a and 16b and over the focusing screen to retain the mask 4 thereon. To remove the mask, push button 20 is pressed into opening 16c. This bows the central portion of spring 17 inwardly as indicated in Fig. 6 and hence retracts the clip ends 15 as appears. When pressure on the button 20 is released, the force of the spring 17 pushes the button backwardly until it engages the stop member 22, whereupon it can move back no farther and the spring 17 is still retained in the groove 19.

It is obvious that in a similar manner other accessories and supplementary parts can be connected with the ground glass instead of the image field mask, for example, field lenses, lens plates and wedge screening plates, filters, foils and the like.

Furthermore, the clip 8 or 20 which projects resiliently outwards can be employed for the latching of other supplementary parts which are fitted on the outside over the light hood, such as, for example, supplementary fitted light hoods made of leather, so that a separate securing device for this purpose is made superfluous by means of the invention.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

Certain subject matter disclosed in this application is claimed in applicant's copending application, Serial No. 686,757, filed September 27, 1957.

What is claimed is:

1. The combination with a reflex camera body having a horizontally arranged focusing screen at its top and having collapsible and erectable walls which, when in erected position, extend upwardly substantially from the edges of said focusing screen to form an open-top shadow box for said screen, of spring clip means releasable from outside said shadow box for overlying and detachably holding one edge of a mask or the like lying horizontally on said focusing screen within said shadow box, said clip means including a retaining portion in the form of a bent resilient wire having a loop normally located within said shadow box in overlying relation to said mask or the like, two stops engaging said wire at two points both spaced from said loop to limit inward movement of the engaged part of the wire, and a manipulating portion in the form of a manually accessible button projecting exteriorly beyond the rear wall of said shadow box approximately at the level of said focusing screen and engaging said wire on the opposite side of said stops from said loop, said button being so located with relation to said wire that inward manual pressure on the projecting end of said button will press against and flex said resilient wire to move said loop outward to non-overlying relation to said mask or the like so that said mask or the like may be removed from the focusing screen and lifted upwardly through said shadow box.

2. The combination with a reflex camera body having a horizontally arranged focusing screen at its top and having collapsible and erectable walls which, when in erected position, extend upwardly substantially from the edges of said focusing screen to form an open-top shadow box for said screen, of spring clip means releasable from outside said shadow box for overlying and detachably holding one edge of a mask or the like lying horizontally on said focusing screen within said shadow box, said clip means including a retaining portion in the form of a bent resilient wire extending approximately horizontally near and generally along the rear edge of said focusing screen and having near its ends two forwardly projecting loops normally located within said shadow box in overlying relation to said mask or the like, said clip means also including a manipulating portion in the form of a manually accessible button projecting exteriorly beyond the rear wall of said shadow box approximately at the level of said focusing screen, spaced stops engaging said wire on opposite sides of said button for limiting inward movement of the wire, said button being located approximately opposite the mid point of said wire and so arranged with relation thereto that inward manual pressure on the projecting end of said button will flex the mid portion of said wire between said stops inwardly and withdraw said loops thereof outwardly to non-overlying relation to said mask or the like so that said mask or the like may be removed from the focusing screen and lifted upwardly through said shadow box.

References Cited in the file of this patent

UNITED STATES PATENTS

| 508,204 | Bullard | Nov. 7, 1893 |
| 1,159,441 | Wallace | Nov. 9, 1915 |
| 1,614,827 | Coats | Jan. 18, 1927 |

FOREIGN PATENTS

| 300,863 | Germany | Sept. 24, 1917 |
| 501,914 | Germany | July 19, 1930 |
| 139,655 | Austria | Dec. 10, 1934 |
| 250,013 | Italy | Sept. 2, 1926 |